United States Patent [19]
Howlett et al.

[11] Patent Number: 5,701,345
[45] Date of Patent: Dec. 23, 1997

[54] MULTIPATH INTERFERENCE REDUCTION SYSTEM AND METHOD

[75] Inventors: Gordon Phillip Howlett, Greentown; John Norris Reigler, Kokomo, both of Ind.

[73] Assignee: Delco Electronics Corporation, Kokomo, Ind.

[21] Appl. No.: 621,549

[22] Filed: Mar. 25, 1996

[51] Int. Cl.[6] .................................... H04H 5/00
[52] U.S. Cl. .................... 381/13; 381/10; 381/11; 381/94
[58] Field of Search .................... 381/3–4, 7, 10–11, 381/13, 17–18, 94, 106

[56] References Cited

U.S. PATENT DOCUMENTS

| | | | |
|---|---|---|---|
| 4,029,906 | 6/1977 | Takahashi | 381/10 |
| 4,694,500 | 9/1987 | Tazaki et al. | 381/10 |
| 4,704,726 | 11/1987 | Gibson | 381/13 |
| 4,833,715 | 5/1989 | Sakai | 381/17 |
| 5,113,446 | 5/1992 | Kennedy | 381/13 |
| 5,455,866 | 10/1995 | Ohashi | 381/10 |

*Primary Examiner*—Curtis Kuntz
*Assistant Examiner*—Duc Nguyen
*Attorney, Agent, or Firm*—Jimmy L. Funke

[57] ABSTRACT

A multipath interference reduction system and method for smoothly reducing noise associated with FM stereo signal reception with an adjustable blend. The system includes a peak detector for detecting noise present in the received signal. When the detected noise exceeds a first threshold limit, stereo separation reduction is provided. The amount of stereo separation reduction may be adjusted so as to provide a greater reduction at higher noise frequencies than at lower noise frequencies to enhance the audio sound. When the determined noise exceeds a second higher threshold limit, stereo separation is further reduced to provide primarily monoaural reception.

11 Claims, 3 Drawing Sheets

MULTIPATH INTERFERENCE REDUCTION SYSTEM AND METHOD

BACKGROUND OF THE INVENTION

1. Technical Field

This invention relates generally to an audio noise reduction system and, more particularly, to a multipath interference reduction (MIR) system and method for reducing noise otherwise experienced while listening to FM stereo.

2. Discussion

Audio frequency modulated (FM) stereo reception in a moving vehicle is often plagued with background noise generally caused by disruption of a desired radio station's signal by buildings, mountains or other interfering objects. It is generally known that an FM stereo signal, in contrast to an FM monaural signal, is very susceptible to noise disturbances, especially multipath interference. This is generally due to the fact that an audio FM stereo signal further includes an amount of stereo separation between the left and right audio signals to improve the clarity of the audio sound. However, increased stereo separation of the FM stereo signal is usually more susceptible to the effects of noise disturbances and a listener may find the noise effects to be unpleasant.

To minimize the noise effects, many FM stereo receivers that have been employed in automotive radios incorporate some form of audio processing with noise reduction. Quite often, this processing has as part of its operation a blend-to-mono function. The purpose of a conventional blend-to-mono function is to take advantage of the increased noise immunity of FM monaural reception. This blend function is usually controlled by the receiver's signal strength indication, and can also be controlled by some form of multipath interference reduction circuitry.

One conventional multipath interference reduction circuit senses the presence of noise and, in response to the presence of noise, immediately reduces the FM stereo separation to zero. This action is done rather quickly, usually within a few milliseconds, and has the effect of completely changing the FM signal reception from FM stereo reception to FM monaural reception. Once the detected noise ceases, the conventional noise reduction approach releases the complete stereo separation reduction to cause an abrupt transition from FM monaural reception back to FM stereo reception. The net result of this action is an abrupt stereo image collapse to FM monaural reception and an abrupt transition back to FM stereo reception which has been shown to be a cause of automobile customer dissatisfaction with conventional FM stereo receivers.

It is therefore desirable to provide a more intelligent system and method of reducing noise interference associated with reception of an FM stereo signal.

More particularly, it is desirable to provide for a multipath interference reduction system and method which reduces noise associated with reception of FM stereo signals in a less abrupt manner to provide a more transparent transition between FM stereo and monaural reception.

It is further desirable to provide for such a multipath noise reduction system and method for adjusting stereo separation reduction as a function of audio noise frequency so as to optimize the amount of blend.

SUMMARY OF THE INVENTION

In accordance with the teachings of the present invention, a multipath interference reduction system and method are provided for reducing the amount of noise experienced while listening to FM stereo, especially for signal reception in a moving vehicle. The system includes a peak detector for detecting an amount of noise present in a received FM stereo signal. When the amount of noise exceeds a first threshold limit, noise reduction is provided by reducing the amount of stereo separation present in the signal. The stereo separation reduction is adjusted as a function of audio frequency of the noise so that with higher frequency noise there is a greater stereo separation reduction than at a lower frequency noise. Furthermore, if the amount of noise detected exceeds an upper threshold limit, a full reduction of stereo separation is provided so as to reduce signal reception to FM monaural reception. An increase in stereo separation is allowed when the amount of noise detected decreases.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
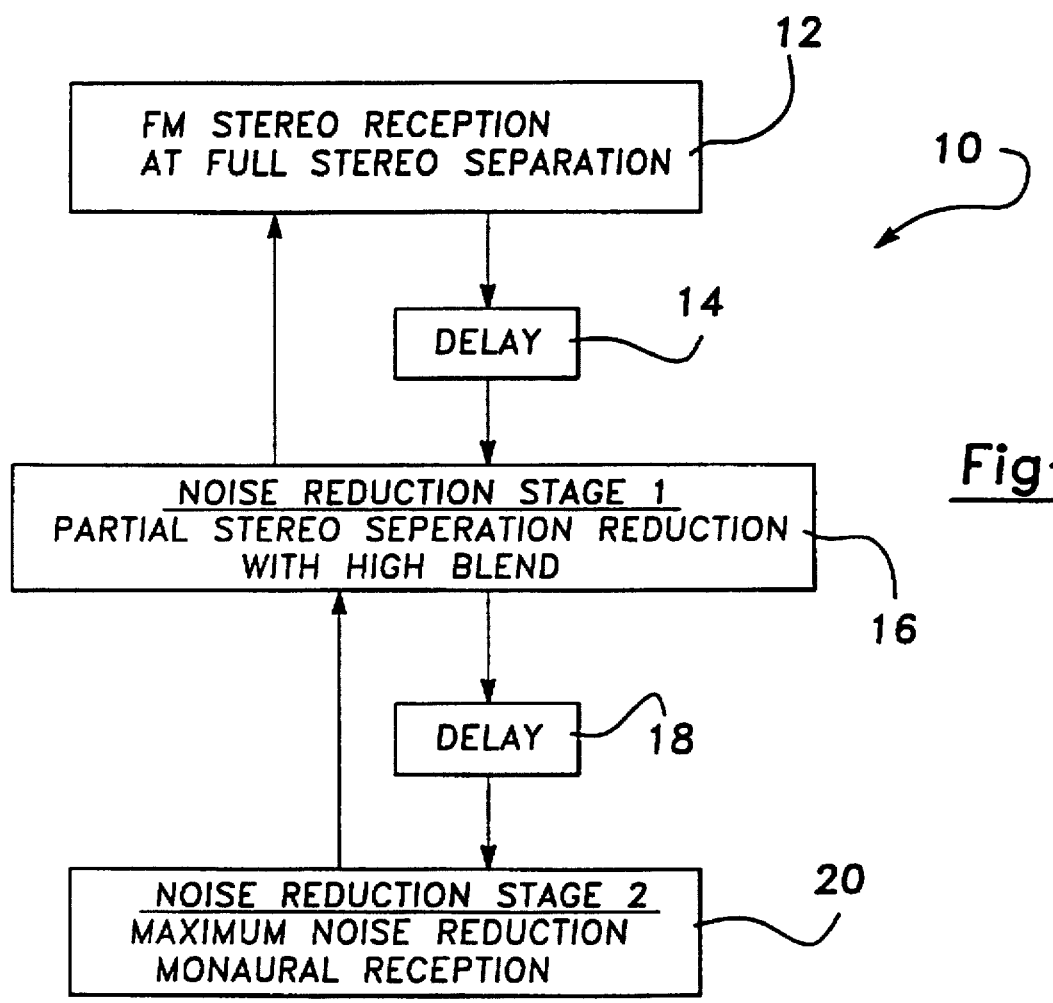
FIG. 1 is a block diagram illustrating FM stereo reception and noise reduction according to the present invention.

Turning now to FIG. 1, a multipath interference reduction system 10 is shown in a block diagram for providing FM stereo reception and noise reduction in accordance with first and second noise reduction stages. The multipath interference reduction system 10 is adapted to provide full FM stereo reception with full stereo separation as shown in block 12. The available amount of stereo separation may depend on the predefined stereo separation provided in the FM stereo signal as well as the design parameters of a given radio receiver. For example, a radio transmission station may transmit an FM stereo signal with a stereo separation of between 40 to 45 decibels (dB) maximum, while a typical automobile radio receiver may operate with a maximum stereo separation of between 35 to 40 dB.

According to the present invention, the multipath interference reduction system 10 provides noise reduction according to a first stage (stage 1) 16 and further provides additional noise reduction pursuant to a second stage (stage 2) 20. The two-stage noise reduction system 10 of the present invention is designed to provide smooth transitions between FM stereo reception and FM monaural reception in a manner that is as transparent to the listener as possible.

Under normal operating conditions, the multipath interference reduction system 10 will operate at full stereo separation 12 until the presence of enough noise activates the noise reduction system. In doing so, noise reduction system 10 will monitor the noise interference associated with the FM stereo signal. Noise interference is typically present as an AC component, and noise caused by multipath interference commonly contains an amplitude modulation (AM) component. When the AC noise component becomes excessive, the noise reduction system 10 will activate a partial stereo separation reduction according to the first noise reduction stage 16. In doing so, a slight delay in the noise reduction action at the onset of noise occurrence is introduced via delay 14. An excessive amount of noise may be determined by determining when the amount of noise or the proportion of noise to FM signal exceeds a first threshold limit. For example, excessive noise which may activate partial stereo separation reduction stage 16 may occur when the amplitude modulation (AM) noise equivalent on the FM carrier signal amounts to seventy percent (70%) or more of the FM signal. It should be appreciated that when noise activates the first stage 16 of noise reduction system 10, only a partial stereo separation reduction occurs. This provides for some noise reduction but also preserves some FM stereo separation. This partial separation reduction may vary according to a blend-to-mono function.

The continuous presence of excessive noise may further activate the second stage 20 of the multipath interference reduction system 10. The second noise reduction stage 20 completely reduces the FM stereo separation to FM monaural reception at maximum noise reduction. Additionally, a transition from the first stage 16 of partial stereo separation reduction to the second noise reduction stage 20 occurs following the lapse of a delay period via delay 18.

At the cessation of a long noise burst, the noise reduction system 10 may quickly return from the second stage 20 to the partial stereo separation of the first stage 16. Once a transition from the second stage 20 to the first stage 16 occurs, a slow transition from the partial stereo separation of first stage 16 to the full stereo separation mode 12 begins. Continued short bursts of noise can maintain the noise reduction system 10 in the partial stereo separation reduction mode of the first stage 16. Overall, the net effect is to introduce only as much noise reduction as is required to improve FM reception performance and to make the transitions between levels of noise reduction smoother and less obvious to the listener so as to realize a more pleasant sound.

The partial stereo separation reduction of the first stage 16 further enhances audio processing action by employing a high blend function according to the present invention. The high blend function advantageously makes transitions between FM stereo and FM monaural reception more transparent to the listener. This is accomplished by employing a high blend characteristic whereby higher frequency audio noise components in FM stereo audio are blended together, while low and mid audio noise frequencies have less or no blending action.

Figure 2:
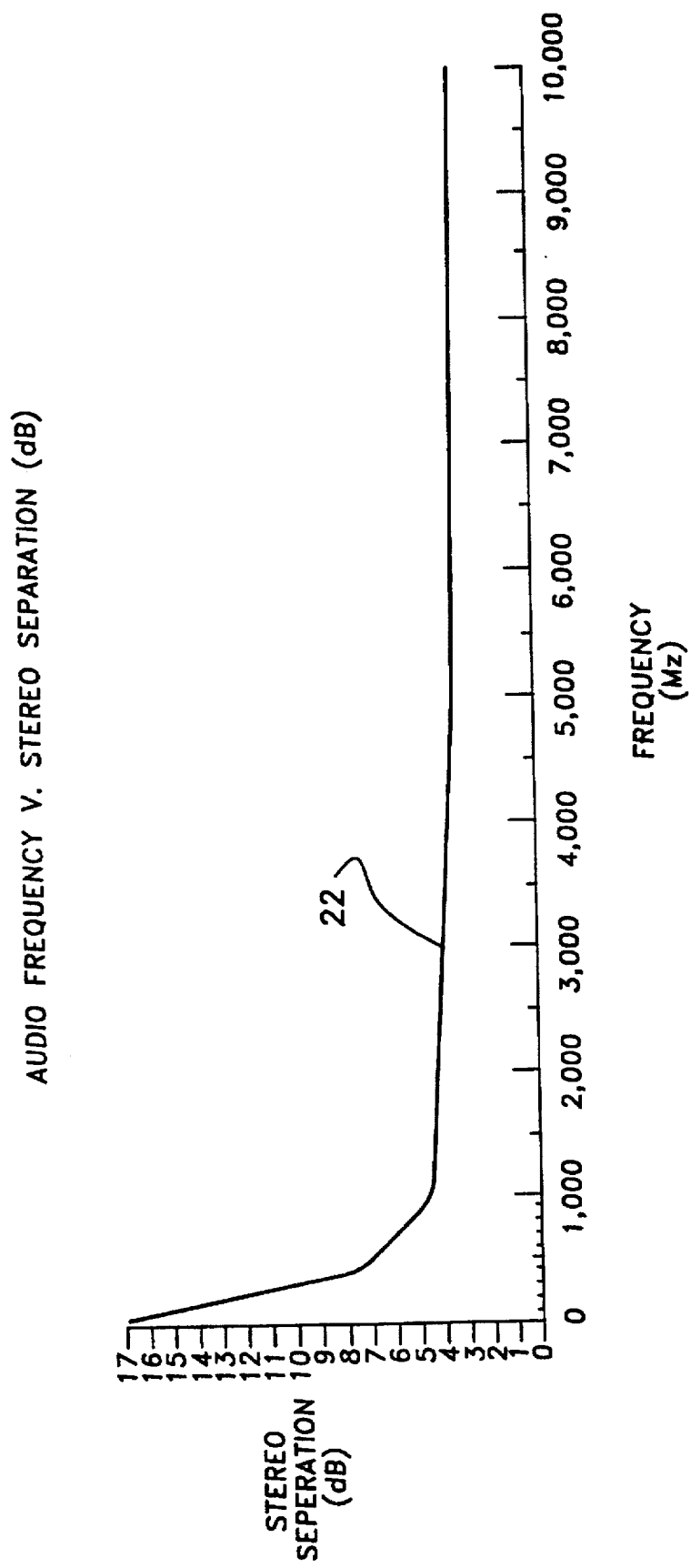
FIG. 2 is a graphical representation of audio noise frequency versus FM stereo separation as adjusted in accordance with one example of the present invention.

With particular reference to FIG. 2, line 22 illustrates one example of stereo separation adjustments for various audio noise frequencies. The high blend function can reduce more noticeable high frequency stereo noise, especially multipath noise interference, while maintaining good stereo sound in the low and mid frequency portions of the programming. The amount of stereo separation will vary depending on the audio frequency of the detected noise. According to this example, a noise frequency of 80 hertz will exhibit a stereo separation of 17 dB, while an audio frequency of 400 hertz due to noise will require a greater stereo separation reduction to reduce the stereo separation to about 7.5 dB. At a noise frequency of 10,000 Hertz, the stereo separation is further reduced to 3.2 dB. Accordingly, the amount of stereo separation decreases as the audio frequency of the noise increases. This has the effect of providing a higher mono-to-stereo blend for higher frequencies which typically tend to be more unpleasant in stereo reception with the presence of noise interference.

Figure 3:
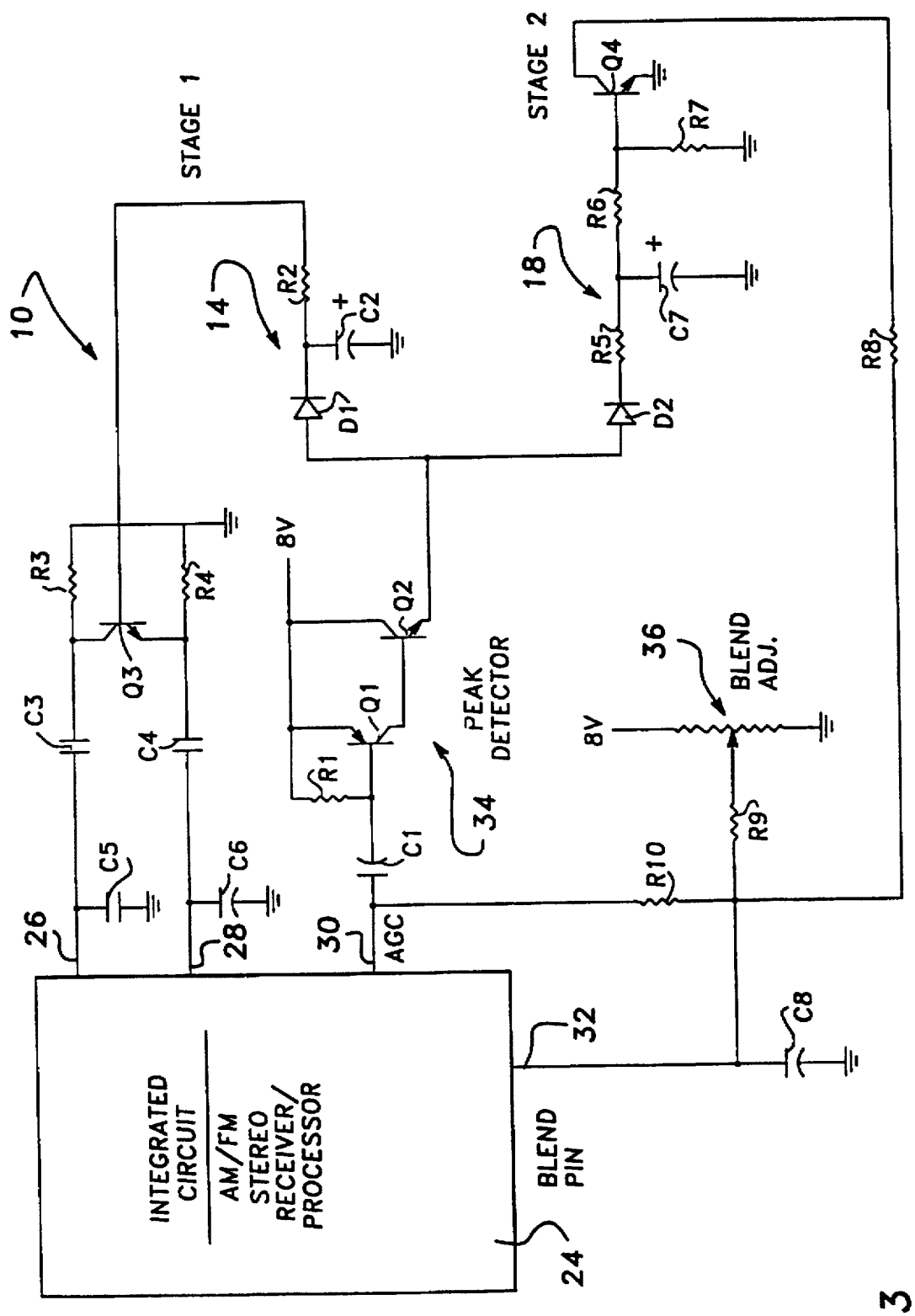
FIG. 3 is a circuit diagram illustrating the multipath interference reduction system circuit configuration of the present invention.

Referring to FIG. 3, the multipath interference reduction system 10 is shown implemented in a circuit configuration.

The multipath interference reduction circuit 10 is coupled to an integrated circuit configured to provide an AM/FM stereo receiver/processor 24. Receiver/processor 24 has a left audio input line 26 and a right audio input line 28. Audio input lines 26 and 28 provide the receiver 24 with left and right audio signals, respectively. For FM stereo reception, stereo separation is present between the signals on audio input lines 26 and 28.

The multipath interference reduction circuit 10 includes a peak detector 34 which is made up of a pair of transistors Q1 and Q2 both coupled to an eight volt (8 v) source and configured to receive an output from the automatic gain control (AGC) output line 30 of receiver/processor 24. AGC output line 30 contains a DC signal indicative of FM signal strength and may also contain an AC component due to noise. Transistor Q1 is a pnp transistor that is biased with resistor R1 and has the base coupled to the AGC output line 30 via capacitor C1. Transistor Q1 is further coupled to npn transistor Q2 and together transistors Q1 and Q2 provide for peak detection of the AC noise-related signal present on the AGC output line 30. In doing so, peak detector 34 will forward bias when an adequate amount of AC signal due to noise is present and further provide a current amplified output signal. Accordingly, peak detector 34 produces an output when a predetermined first noise threshold value is exceeded.

The multipath interference reduction circuit 10 further includes an isolation diode D1 coupled to an output of the peak detector 34 and further coupled to RC circuitry made up of resistor R2 and capacitor C2. The output impedance of peak detector 34, resistance of diode D1 and capacitor C2 are configured to provide the time delay 14. Isolation diode D1 also prevents reverse signal transmission back to the peak detector and to stage 2. Stage 1 further includes an npn transistor Q3 having a base coupled to the output of time delay 14 for receiving the peak detector output signal. Transistor Q3 is connected to the left audio input line 26 and the right audio input line 28 via respective transistor terminals and capacitors C3 and C4, respectively. Additionally, audio input lines 26 and 28 are each coupled to ground through resistors R3 and R4, respectively. Transistor Q3 provides switching to short together the audio input lines 26 and 28 so as to reduce the amount of stereo separation reduction according to the high blend function. The high blend is realized by the shunting of capacitors C3 and C4 across the audio input lines 26 and 28 that occurs with the switching of transistor Q3. The amount of stereo separation reduction is dependent upon the audio noise frequency as well as circuit values chosen for a given application. The high blend characteristic is determined by the impedance seen at audio input lines 26 and 28 as well as the capacitance provided via capacitors C3 and C4. Adjustment of the impedance and capacitance may be provided to achieve a desired stereo separation reduction for various noise frequencies.

The second stage 20 of multipath interference reduction circuit 10 includes an isolation diode D2 also coupled to the output of peak detector 34 and time delay circuit 18 which is made up of RC circuitry including the output impedance of peak detector 34, resistance of diode D2, resistor R5 and capacitor C7. Time delay 18 provides a time delay introduced before a transition is allowed to occur from the first stage 16 to the second stage 20 of the noise reduction system 10. Isolation diode D2 prevents reverse transmission of signals back to stage 1 and to the peak detector. The time delay 18 output is fed through a resistor network made up of resistors R7 and R8 to a base of a transistor Q4. Transistor Q4 is grounded so that when the noise detected by peak detector 34 exceeds a second threshold value, transistor Q4 grounds the output line thereof which is provided through resistor R8 to the blend pin input 32 of receiver/processor 24. This in effect will cause a complete or near complete stereo separation reduction to provide maximum noise reduction at FM monaural reception. The second threshold value may include a predetermined value greater than the first threshold value.

Also included in multipath interference reduction circuit 10 is a blend adjustment potentiometer 36 which is coupled to the AGC output line 30 via resistors R10 and R9. A capacitor C8 is further coupled to the blend pin input 32 and ground. Blend adjustment potentiometer 36 provides the normal setting for blend and blend pin input 32, while resistor R10 and capacitor C8 provide a time constant. The degree of stereo separation is determined by the voltage applied to stereo decoder blend control pin 32 as derived from the AGC output line 30 and function of signal strength.

In operation, the multipath interference reduction circuit 10 of the present invention provides the first stage 16 and the second stage 20 of noise reduction. This is accomplished by the peak detector 34 detecting the amplitude of an AC component generally caused by noise on the AGC output line 30. Upon exceeding a first threshold value, peak detector 34 produces an output signal which is supplied to both the first and second stages. With the first noise reduction stage 16, the output of peak detector 34 undergoes a time delay via delay 14 before allowing a transition to the partial noise reduction stage 16. Provided there is excessive noise and the time delay 14 has elapsed, transistor Q3 switches so as to short the audio input lines 26 and 28 together to shunt capacitors C3 and C4 thereby causing a stereo separation reduction in accordance with the high blend function. This reduces the amount of stereo separation on the audio input lines 26 and 28.

If the amount of noise detected by peak detector 34 continues for a time period beyond the time delay of delay 18 and further exceeds a second threshold value as determined by transistor Q4, the maximum noise reduction pursuant to the second stage 20 will take place. In doing so, transistor Q4 will ground out the blend pin 32 input to receiver/processor 24 through resistor R8 when the input at the base of transistor Q4 exceeds the second threshold value. This in effect will cause maximum noise reduction by pulling the blend pin input 32 to a voltage which causes zero decibels (0dB) stereo separation to thereby provide FM monaural reception pursuant to second stage 20.

Provided noise reduction system 10 is undergoing maximum noise reduction pursuant to the second stage 20, the multipath interference reduction circuit 10 will quickly return to the first stage 16 once the detected noise drops below the second threshold value as determined by transistor Q4. The partial stereo separation reduction provided by the first stage 16 will change in accordance with the high blend function so that the amount of separation is adjusted in accordance with the frequency of the noise. The partial stereo separation reduction of first stage 16 will then begin a slow transition back toward full FM stereo reception 12.

With the use of multipath interference reduction circuit 10, very severe multipath noise can turn on the first and second stages 16 and 20 in succession rather quickly when necessary, while less severe noise may activate the only the first stage 16 with a slightly longer delay. Further, when severe noise ceases, the second stage 20 is deactivated quickly, leaving only the first stage 16 active which begins a transition back to full stereo reception.

In actual operation, most multipath interference conditions which are normally experienced will activate just the partial separation of the first stage 16. Only the severest noise occurrences will activate the maximum noise reduction of the second stage 20. The net effect is a transparent noise reduction process that is often inaudible to the listener. Further, by selecting system sensitivity to noise, turn on delays, and turn off delays, a wide choice of multipath noise reduction is available to the user.

In order to increase clarity of the multipath interference reduction circuit 10 as shown in FIG. 3, the values for the various components were not included thereon. However, for the sake of completeness, examples of these component values are listed below:

| Reference | Part Value |
| --- | --- |
| C1 | .047 µF |
| C2 | 6.8 µF |
| C3,C4 | .068 µF |
| C5,C6 | .01 µF |
| C7 | 1 µF |
| C8 | .1 µF |
| D1,D2 | 1N914 |
| R1 | 47k ohm |
| R2,R3,R4,R6 | 100k ohm |
| R5 | 4.7k ohm |
| R7 | 22k ohm |
| R8 | 220k ohm |
| R9 | 82k ohm |
| R10 | 390k ohm |
| Q1 | 2N2907 |
| Q2 | 2N2222 |
| Q3 | 2N2222 |
| Q4 | 2N2222 |

While this invention has been disclosed in connection with a particular example thereof, no limitation is intended thereby except as defined in the following claims. This is because a skilled practitioner recognizes that other modification can be made without departing from the spirit of this invention after studying the specification and drawings.

The embodiments of the invention in which an exclusive property or privilege is claimed are defined as follows:

1. A method of reducing effects of noise interference associated with reception of FM stereo signals comprising the steps of:

receiving an FM stereo signal;

determining an amount of noise present in the detected FM stereo signal;

reducing stereo separation in the detected signal when the determined amount of noise exceeds a first threshold limit;

adjusting the stereo separation reduction as a function of audio frequency of the noise so as to provide a greater stereo separation reduction at a higher noise frequency than at a lower noise frequency to enhance audio sound;

determining when the determined amount of noise exceeds a second threshold limit which is greater than the first threshold limit; and further reducing the stereo separation so as to provide substantially monaural reception when the amount of noise exceeds the second threshold limit.

2. The method as defined in claim 1 wherein said step of adjusting further comprises automatically adjusting the stereo separation reduction.

3. The method as defined in claim 1 wherein said step of determining an amount of noise further comprises determining an AC signal amplitude of the noise caused by multipath interference.

4. The method as defined in claim 1 further comprising the step of waiting for a delay time period before reducing stereo separation.

5. The method as defined in claim 1 wherein said reception is provided by a receiver in a moving vehicle.

6. A method of reducing effects of noise including noise caused by multipath interference associated with reception of FM stereo signals comprising the steps of:

receiving an FM stereo signal;

determining an amount of noise present in the detected FM stereo signal;

determining when the amount of noise exceeds a first noise limit;

reducing stereo separation in the received FM stereo signal when the determined amount of noise exceeds the first noise limit for a first time delay period;

adjusting the stereo separation reduction as a function of audio frequency of the noise so as to provide a greater stereo separation reduction at a higher noise frequency than a lower noise frequency;

determining if the amount of noise exceeds a second noise limit which is greater than the first noise limit; and further reducing stereo separation in the FM signal when the noise exceeds the second noise limit for a second time delay period so as to provide primarily FM monaural reception to reduce noise effects.

7. The method as defined in claim 6 further comprising the step of increasing the stereo separation so as to return to FM stereo reception once the amount of noise is reduced.

8. A noise reduction system for reducing effects of noise associated with FM stereo reception comprising:

a receiver for receiving and processing an FM stereo signal;

a detector for detecting an amount of noise present in the received FM stereo signal;

a left audio input line and a right audio input line coupled to the receiver for conducting stereo signals; and a first noise reduction circuit for reducing stereo separation provided across the left and right audio input lines when the amount of noise exceeds a first noise limit and adjusting the stereo separation reduction as a function of audio frequency of the noise so as to provide a greater stereo separation at a higher noise frequency than a lower noise frequency to enhance audio sound; and a second noise reduction circuit for further reducing the stereo separation of the FM signal so as to provide primarily monaural reception when the amount of noise exceeds a second noise limit, wherein the second noise limit is greater than the first noise limit.

9. The system as defined in claim 8 wherein said detector comprises a peak detector.

10. The system as defined in claim 8 wherein said each of said first and second noise reduction circuits for reducing stereo separation includes resistor and capacitor circuitry.

11. In an audio stereo system having a receiver with left and right audio input lines adapted to receive FM stereo signals, a multipath interference reduction circuit for reducing effects of noise interference associated with FM stereo signal reception comprising:

a peak detector for monitoring a received FM stereo signal and detecting an amount of noise associated therewith;

a first noise reduction circuit for reducing stereo separation of the FM signal when the determined amount of noise exceeds a first noise limit for a first time delay period and adjusting the stereo separation reduction as a function of audio frequency of the noise so as to provide a greater stereo separation reduction at a higher noise frequency than at a lower noise frequency to enhance audio sound; and a second noise reduction circuit for further reducing the stereo separation of the FM signal so as to provide monaural reception when the amount of noise exceeds a second noise limit for a second time delay period, wherein the second noise limit is greater than the first noise limit, and the second noise reduction circuit reduces stereo separation faster than the first noise reduction circuit.

\* \* \* \* \*